United States Patent
Yadav et al.

(10) Patent No.: US 10,711,174 B2
(45) Date of Patent: Jul. 14, 2020

(54) DIVALENT BRINE FLUIDS HAVING IMPROVED RHEOLOGY AND MULTIFUNCTIONAL PROPERTIES

(71) Applicants: Prahlad Yadav, The Woodlands, TX (US); Mohammed Al-Rabah, Al Qatif (SA); Gaurav Agrawal, Aurora, CO (US)

(72) Inventors: Prahlad Yadav, The Woodlands, TX (US); Mohammed Al-Rabah, Al Qatif (SA); Gaurav Agrawal, Aurora, CO (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 71 days.

(21) Appl. No.: 15/825,480

(22) Filed: Nov. 29, 2017

(65) Prior Publication Data

US 2018/0155598 A1    Jun. 7, 2018

Related U.S. Application Data

(60) Provisional application No. 62/429,942, filed on Dec. 5, 2016.

(51) Int. Cl.

| | | |
|---|---|---|
| C09K 8/035 | (2006.01) | |
| C09K 8/06 | (2006.01) | |
| C09K 8/86 | (2006.01) | |
| E21B 43/16 | (2006.01) | |
| C09K 8/04 | (2006.01) | |
| C01F 11/34 | (2006.01) | |
| C01G 9/04 | (2006.01) | |
| C01F 11/24 | (2006.01) | |
| C09K 8/58 | (2006.01) | |

(52) U.S. Cl.
CPC .............. *C09K 8/035* (2013.01); *C09K 8/04* (2013.01); *C09K 8/06* (2013.01); *C09K 8/58* (2013.01); *C09K 8/86* (2013.01); *E21B 43/16* (2013.01); *C01F 11/24* (2013.01); *C01F 11/34* (2013.01); *C01G 9/04* (2013.01); *C01P 2006/22* (2013.01); *C09K 2208/34* (2013.01)

(58) Field of Classification Search
CPC . C09K 8/035; C09K 8/04; C09K 8/86; C09K 2208/34
See application file for complete search history.

(56) References Cited

U.S. PATENT DOCUMENTS

| | | |
|---|---|---|
| 4,822,500 A | 4/1989 | Dobson et al. |
| 5,785,747 A | 7/1998 | Vollmer et al. |
| 6,124,244 A | 9/2000 | Murphey |
| 6,300,286 B1 | 10/2001 | Dobson et al. |
| 6,391,830 B1 | 5/2002 | Dobson et al. |
| 7,211,546 B2 | 5/2007 | Dobson et al. |
| 7,343,986 B2 * | 3/2008 | Dixon .................... C09K 8/035 175/65 |
| 7,387,985 B2 | 6/2008 | Kippie et al. |
| 2005/0199428 A1 | 9/2005 | Dixon |
| 2006/0116296 A1 * | 6/2006 | Kippie .................... C09K 8/12 507/244 |
| 2013/0098615 A1 | 4/2013 | Perez et al. |
| 2014/0148366 A1 * | 5/2014 | Reyes Bautista ........ C09K 8/12 507/101 |

FOREIGN PATENT DOCUMENTS

| | | |
|---|---|---|
| EP | 0786507 | 7/1997 |
| EP | 0758011 | 12/1997 |
| EP | 0884369 | 12/1998 |

OTHER PUBLICATIONS

"TMS EDE Salt", Radiagreen, Oleon a Natural Chemistry; 1 page.
Chapman, Paul "Safety Data Sheet PCS109" Baker Hughes Inc., May 24, 2007; 4 pages.
HSE Department TBC-BRINADD, LLC. "Safety Data Sheet" Revised May 8, 2015; 9 pages.
TBC-BRINADD LLC. "TBC-X388" 1 page.
Thatcher, Melanie "Safety Data Sheet Teq-Lube II" Baker Hughes INc., Revised Jul. 22, 2004; 4 pages.

* cited by examiner

*Primary Examiner* — Aiqun Li
(74) *Attorney, Agent, or Firm* — Cantor Colburn LLP

(57) ABSTRACT

A method of improving rheological properties of a divalent brine based downhole treatment fluid at an elevated temperature comprises adding to the divalent brine based downhole treatment fluid a rheological modifier, which comprises a carboxylic acid ester, or a phosphate ester blended with an ethoxylated glycol, or a combination comprising at least one of the foregoing in an amount effective to improve the rheological properties of the divalent brine based downhole treatment fluid at a temperature of greater than about 200° F. The divalent brine based downhole treatment fluid comprises calcium bromide, calcium chloride, zinc bromide, zinc chloride, or a combination comprising at least one of the foregoing.

8 Claims, No Drawings

DIVALENT BRINE FLUIDS HAVING IMPROVED RHEOLOGY AND MULTIFUNCTIONAL PROPERTIES

CROSS-REFERENCE TO RELATED APPLICATIONS

The present application claims priority to U.S. Provisional Patent Application No. 62/429,942, filed Dec. 5, 2016. The contents of the priority application are hereby incorporated by reference in their entirety.

BACKGROUND

This disclosure relates to methods of improving the rheology properties of divalent brine based fluids. The disclosure also relates to divalent brine based fluids having improved rheology and multifunctional properties and methods of using such fluids.

Divalent brines are mainly used to prepare drill-in fluids. Drill-in fluids are designed to be essentially non-damaging to the producing formation. Ideally, drill-in fluids can also provide superior hole cleaning property, allow easy clean-up, and are cost effective.

In conventional drill-in fluids, organic polymers are often used to control rheological and fluid loss properties. While organic polymers are normally stable in fresh water, they can rapidly degrade in a divalent salt environment resulting in system instability, especially at an elevated temperature. Accordingly, the art would be receptive to alternative additives that are effective to enhance the rheological profile of a divalent brine based fluid at elevated temperatures. It would be a further advantage if such additives could also enhance fluid loss control or lubricity of the divalent brine based fluid.

BRIEF DESCRIPTION

A method of improving rheological properties of a divalent brine based downhole treatment fluid at an elevated temperature comprises adding to the divalent brine based downhole treatment fluid a rheological modifier, which comprises a carboxylic acid ester, or a phosphate ester blended with an ethoxylated glycol, or a combination comprising at least one of the foregoing in an amount effective to improve the rheological properties of the divalent brine based downhole treatment fluid at a temperature of greater than about 200° F. The divalent brine based downhole treatment fluid comprises calcium bromide, calcium chloride, zinc bromide, zinc chloride, or a combination comprising at least one of the foregoing.

A method of conducting a wellbore operation in a subterranean formation comprises: employing in the wellbore operation a divalent brine based treatment fluid comprising a divalent brine comprising calcium bromide, calcium chloride, zinc bromide, zinc chloride, or a combination comprising at least one of the foregoing; and an rheological modifier comprising a carboxylic acid ester, or a phosphate ester blended with an ethoxylated glycol, or a composition comprising at least one of the foregoing.

A divalent brine based downhole treatment fluid comprises about 10 to about 18 pounds per gallons of a divalent brine comprising calcium bromide, calcium chloride, zinc bromide, zinc chloride, or a combination comprising at least one of the foregoing; and about 1 to about 12 pounds of an rheological modifier per barrel of the divalent brine based downhole treatment fluid, the rheological modifier comprising a carboxylic acid ester, or a phosphate ester blended with an ethoxylated glycol, or a composition comprising at least one of the foregoing.

DETAILED DESCRIPTION

It has been found that rheological modifiers described herein impart desirable properties to a variety of downhole treatment fluids, especially divalent brine based drilling fluids, completion fluids, or servicing fluids. In particular, a carboxylic acid ester or a phosphate ester blended with an ethoxylated glycol is effective to enhance the rheological properties of the divalent brine based fluids such as yield point and low-shear-rate-viscosity. In a further advantageous feature, the rheological modifiers are effective to enhance the fluid loss control and lubricity of the divalent brine based fluids.

The divalent based fluids comprise calcium bromide, calcium chloride, zinc bromide, zinc chloride, or a combination comprising at least one of the foregoing. Monovalent brine can optionally be present. Exemplary fluids contain about 10 to about 18 pounds per gallons of calcium bromide, calcium chloride, or a combination thereof.

The carboxylic acid ester has a formula

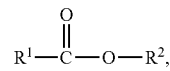

wherein $R^1$ and $R^2$ are each independently a $C_{1-26}$ alkyl, $C_{2-26}$ alkenyl, or $C_{2-26}$ alkynyl group. Specifically $R^1$ is a $C_{6-20}$ alkyl, $C_{6-20}$ alkenyl, or $C_{6-20}$ alkynyl group; and $R^2$ is methyl. In another embodiment, $R^1$ is a $C_{8-14}$ alkyl; and $R^2$ is a $C_{6-20}$ alkyl, $C_{6-20}$ alkenyl, or $C_{6-20}$ alkynyl group. Exemplary carboxylic acid esters have a formula I or II

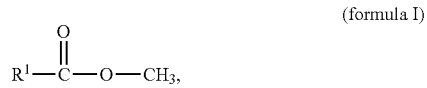

(formula I)

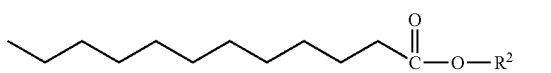

(formula II)

wherein $R^1$ and $R^2$ are each independently a $C_{6-20}$ alkyl, $C_{6-20}$ alkenyl, or $C_{6-20}$ alkynyl group.

The ethoxylated glycol comprises ethoxylated ethylene glycol, ethoxylated propylene glycol, ethoxylated glycerin, ethoxylated polyethylene glycol, ethoxylated polypropylene glycol, or a combination comprising at least one of the foregoing.

In an embodiment, the phosphate ester is a hydrocarbyl polyether phosphate ester optionally comprising one or two hydroxyl groups directly attached to phosphorus.

The rheological modifier can be added to the divalent brine based downhole treatment fluid in an amount of about 1 to about 12 pounds or about 0.5 to about 10 pounds per barrel of the divalent brine based downhole treatment fluid (ppb). In exemplary embodiments, when the rheological modifier comprises a carboxylic acid ester, the rheological modifier is added in an amount of about 3 to about 8 ppb, and when the rheological modifier comprises a phosphate ester blended with an ethoxylated glycol, the rheological modifier is added in an amount of about 0.5 to about 4 ppb.

The rheological modifiers as disclosed herein are effective to enhance rheological properties particularly yield point, low-shear-rate-viscosity, or a combination comprising at least one of the foregoing of the divalent based downhole treatment fluids at a temperature of greater than about 200° F., specifically about 200° F. to about 300° F. For example, the rheological modifiers can increase the yield point of the fluids for up to about 66%. The addition of the rheological modifier further improves the fluid loss control and lubricity of the divalent based downhole treatment fluids.

Known additives typically used in the treatment fluids include but are not limited to fluid loss control agents, lubricants, pH modifiers, pH stabilizers, viscosifiers, weighting agents, or a combination comprising at least one of the foregoing. Exemplary pH modifiers include magnesium oxide, magnesium hydroxide, calcium oxide, calcium hydroxide, zinc oxide, zinc hydroxide, and the like. Suitable pH stabilizers include diamines such as ethylene diamine. In an embodiment, the pH stabilizer comprises ethylene diamine and about 1 to about 5 wt. % of a polyimidazoline, based on the total weight of the pH stabilizer. Exemplary weighting agents include calcium carbonate, magnesium carbonate, zinc carbonate, calcium magnesium carbonate, manganese tetra oxide and the like.

The divalent brine based downhole fluids can include drilling fluids, completion fluids, or servicing fluids. As used herein, the drilling fluids include drill-in fluids, which are specially designed for drilling through the reservoir section of a wellbore.

The divalent brine based downhole treatment fluids can have a yield point of about 20 lb/100 ft$^2$ to about 40 lb/100 ft$^2$ and a plastic viscosity of 26 cP to 38 cP, each determined by hot rolled fluid at 250° F., rheological measurement by OFITE 900 viscometer at 120° F. The divalent brine based downhole treatment fluids can also have a lubricity coefficient of less than 0.13 measured by an OFITE Lubricity Meter. In some embodiments, the divalent brine based downhole treatment fluids have a low shear rate viscosity of greater than about 10,000 cP measured by Brookfield viscometer using spindle S62 at 0.5 rpm. When a diamine pH stabilizer is used, the divalent brine based downhole treatment fluids can have a pH of greater than about 7.5.

The downhole fluids can be used in various applications. A method of conducting a wellbore operation in a subterranean formation comprises employing the divalent brine based downhole treatment fluid in the wellbore operation. In an embodiment, a method of drilling a wellbore in a subterranean formation comprises circulating a drilling fluid in the subterranean formation. The circulation path of the drilling fluid typically extends from the drilling rig down through the drill pipe string to the bit face and back up through the annular space between the drill pipe string and wellbore face to the wellhead and/or riser, returning to the rig. The drilling fluid performs a number of functions as it circulates through the wellbore including cooling and lubricating the drill bit, removing drill cuttings from the wellbore, aiding in support of the drill pipe and drill bit, and providing a hydrostatic head to maintain the integrity of the wellbore walls and prevent well blowouts. The drilling fluid also desirably prevents sloughing and wellbore cave-ins when drilling through water sensitive formations. Drill-in fluids can minimize damage and maximize production of exposed zones. In addition, drill-in fluids can facilitate well completion.

The beneficial effects of using carboxylic acid ester and a blend of phosphate ester and ethoxylated glycol in downhole treatment compositions are further illustrated in the following examples.

EXAMPLES

The materials used in the Examples are described in Table 1.

TABLE 1

| Component | Description | Source, Vendor |
| --- | --- | --- |
| Fluid loss additive | Non Ionic Starch | TBC-BRINADD, LLC |
| MgO | Thermasal B | TBC-BRINADD, LLC |
| PH Stabilizer | Diamine, | BAKER HUGHES INC |
| Mil Carb 45 | Calcium carbonate | BAKER HUGHES INC. |
| Mil Carb Fine | Calcium carbonate | BAKER HUGHES INC. |
| REV DUST | Drill solid material | BAKER HUGHES INC. |
| Phosphate Ester | A blend of phosphate ester and ethoxylated glycol | BAKER HUGHES INC. |
| Carboxylic acid ester | Fatty esters, RADIGREEN EME salt product | OLEON N.V. |
| Viscosifier | Polysacride | TBC-BRINADD, LLC |

Components of drilling fluids were mixed using Multimixer for one hour. The drilling fluids were poured into pressurized aging cells and maintained at 250° F. for 16 hours hot rolled. Post hot rolled rheological properties were measured by OFITE 900 viscometer in accordance with API testing procedures. HPHT fluid loss cell was used for fluid loss measurement. OFITE Lubricity Meter was used for measuring lubricity coefficient. Fluids were designed with 20 ppb, solid contamination (REV DUST) and tested at 250° F. Low shear rate viscosity measured by Brookfield viscometer using spindle S62 at 0.5 rpm. The formulations of the drilling fluids and their properties are shown in Tables 2-6.

TABLE 2

| 14.4 lb/gal drill-in fluid using CaBr$_2$ as the base fluid | | | | | | |
| --- | --- | --- | --- | --- | --- | --- |
| Components (ppb) | 1 | 2 | 3 | 4 | 5 | 6 |
| Calcium bromide brine | 537 | 535.50 | 533.94 | 531.60 | 531.06 | 525.07 |
| Fluid loss additive | 8 | 8 | 8 | 8 | 8 | 8 |
| MgO | 5 | 5 | 5 | 5 | 5 | 5 |
| PH Stabilizer | 3 | 3 | 3 | 3 | 3 | 3 |
| MIL CARB 45 | 15 | 15 | 15 | 15 | 15 | 15 |
| MIL CARB FINE | 20 | 20 | 20 | 20 | 20 | 20 |
| Phosphate ester | — | 1 | 2 | 3.5 | | |
| Carboxylic acid ester | | | | | 3.5 | 7 |
| Fluid Properties After Hot Rolled at 250° F. | | | | | | |
| 600 rpm | 91 | 94 | 111 | 115 | 95 | 104 |
| 300 rpm | 59 | 61 | 73 | 77 | 62 | 70 |
| 200 rpm | 47 | 48 | 58 | 61 | 46 | 53 |

TABLE 2-continued 14.4 lb/gal drill-in fluid using CaBr₂ as the base fluid

| Components (ppb) | 1 | 2 | 3 | 4 | 5 | 6 |
|---|---|---|---|---|---|---|
| 100 rpm | 31 | 32 | 41 | 44 | 32 | 36 |
| 6 rpm | 11 | 11 | 13 | 14 | 10 | 14 |
| 3 rpm | 9 | 9 | 10 | 12 | 8 | 13 |
| Plastic viscosity, cP | 32 | 33 | 38 | 38 | 33 | 34 |
| Yield point, lb/100 ft² | 27 | 28 | 35 | 39 | 29 | 36 |
| 10 Sec gel, lb/100 ft² | 8 | 8 | 10 | 11 | 8 | 11 |
| 10 Min gel, lb/100 ft² | 9 | 9 | 11 | 11 | 9 | 12 |
| 30 Min gel, lb/100 ft² | 9 | 9 | 11 | 11 | 9 | 12 |
| HPHT filtrate (mL/30 min) | 8 | 6.4 | 6.4 | 6.8 | 7.6 | 7.6 |
| pH | 8 | 8 | 8 | 8 | 7.9 | 7.74 |
| Lubricity Coefficient | 0.16 | 0.13 | 0.12 | 0.12 | 0.11 | 0.10 |
| Low Shear Rate Viscosity, cP | 20580 | | | 23650 | 26330 | |

TABLE 3

14.4 lb/gal drill-in fluid using calcium bromide as the base fluid

| Components (ppb) | 7 | 8 | 9 |
|---|---|---|---|
| Calcium bromide brine | 539 | 536 | 533.64 |
| Fluid loss additive | 6 | 6 | 6 |
| MgO | 5 | 5 | 5 |
| PH Stabilizer | 3 | 3 | 3 |
| MIL CARB 45 | 15 | 15 | 15 |
| MIL CARB FINE | 20 | 20 | 20 |
| Phosphate ester | — | 2 | 3.5 |
| Fluid Properties After Hot Rolled at 250° F. | | | |
| 600 rpm | 63 | 77 | 77 |
| 300 rpm | 39 | 49 | 51 |
| 200 rpm | 30 | 37 | 40 |
| 100 rpm | 20 | 25 | 28 |
| 6 rpm | 6 | 9 | 9 |
| 3 rpm | 5 | 7 | 8 |
| Plastic viscosity, cP | 24 | 28 | 26 |
| Yield point, lb/100 ft² | 15 | 21 | 25 |
| 10 Sec gel, lb/100 ft² | 4 | 5 | 7 |
| 10 Min gel, lb/100 ft² | 5 | 7 | 7 |
| 30 Min gel, lb/100 ft² | 6 | 8 | 8 |
| HPHT filtrate (mL/30 min) | 12 | 10 | 10.4 |
| pH | 8 | 8 | 8 |
| Lubricity Coefficient | 0.16 | 0.13 | 0.12 |

TABLE 4

14.4 lb/gal drill-in fluid using calcium bromide as the base fluid with solid contaminations

| Components (ppb) | 1A | 1B | 1C |
|---|---|---|---|
| Calcium bromide brine | 537 | 526.84 | 531.97 |
| Fluid loss additive | 8 | 8 | 8 |
| Viscosifier | | 8 | 3.5 |
| MgO | 5 | 5 | 5 |
| PH Stabilizer | 3 | 3 | 3 |
| MIL CARB 45 | 15 | 15 | 15 |
| MIL CARB FINE | 20 | 20 | 20 |
| Phosphate ester | — | 3.5 | 3.5 |
| REV DUST | 20 | 20 | 20 |
| Fluid Properties After Hot Rolled at 250° F. | | | |
| 600 rpm | 84 | 104 | 91 |
| 300 rpm | 53 | 68 | 61 |
| 200 rpm | 42 | 52 | 46 |
| 100 rpm | 28 | 35 | 32 |
| 6 rpm | 8 | 12 | 11 |
| 3 rpm | 7 | 10 | 10 |
| Plastic viscosity, cP | 31 | 36 | 30 |
| Yield point, lb/100 ft² | 22 | 32 | 31 |
| 10 Sec gel, lb/100 ft² | 6 | 8 | 9 |
| 10 Min gel, lb/100 ft² | 7 | 9 | 9 |
| 30 Min gel, lb/100 ft² | 8 | 9 | 9 |
| HPHT filtrate (mL/30 min) | 7 | 7 | 7.2 |
| pH | 8 | 8 | 8 |

TABLE 5

12 lb/gal drill-in fluid using calcium bromide and calcium chloride as the base fluid

| Components (ppb) | 2A | 2B |
|---|---|---|
| CaBr₂ (14.2 ppg) + CaCl₂ brine(11.6 ppg) | 465 | 461.5 |
| Fluid loss additive | 8 | 8 |
| MgO | 5 | 5 |
| PH Stabilizer | 3 | 3 |
| MIL CARB 45 | 15 | 15 |
| MIL CARB FINE | 20 | 20 |
| Phosphate ester | — | 3.5 |
| Fluid Properties After Hot Rolled at 250° F. | | |
| 600 rpm | 74 | 97 |
| 300 rpm | 46 | 62 |
| 200 rpm | 36 | 49 |
| 100 rpm | 24 | 34 |
| 6 rpm | 7 | 12 |
| 3 rpm | 6 | 10 |
| Plastic viscosity, cP | 28 | 35 |
| Yield point, lb/100 ft² | 18 | 27 |
| 10 Sec gel, lb/100 ft² | 5 | 9 |
| 10 Min gel, lb/100 ft² | 6 | 10 |
| 30 Min gel, lb/100 ft² | 7 | 11 |
| HPHT filtrate (mL/30 min) | 8.2 | 7.4 |
| HPHT fluid loss, ml/30 min 250° F./500 psi using 55 | 4.8 | 3 |
| pH | 8.6 | 8.62 |
| Lubricity Coefficient | 0.13 | 0.10 |
| Low Shear Rate Viscosity, cP | 14357 | 15125 |

TABLE 6 pH enhancement in divalent brine using diamine based pH stabilizer

| Components (ppb) | 3A | 3B | 3C |
|---|---|---|---|
| Calcium bromide brine, 14.2 lb/gal | 537 | 534 | 534 |
| Fluid loss additive | 8 | 8 | 8 |
| Viscosifier | 10 | 10 | 10 |
| MgO | 5 | 5 | 5 |

TABLE 6-continued pH enhancement in divalent brine using diamine based pH stabilizer

| Components (ppb) | 3A | 3B | 3C |
|---|---|---|---|
| PH Stabilizer | — | 3 | 3 |
| MIL CARB 45 | 10 | 10 | 10 |
| MIL CARB FINE | 20 | 20 | 20 |
| Phosphate ester | — | 3.5 | |
| Carboxylic acid ester | | | 3.5 |
| Fluid Properties After Hot Rolled at 250° F. | | | |
| 600 rpm | 93 | 102 | 115 |
| 300 rpm | 60 | 68 | 78 |
| 200 rpm | 48 | 54 | 62 |
| 100 rpm | 32 | 38 | 44 |
| 6 rpm | 8 | 14 | 17 |
| 3 rpm | 7 | 12 | 15 |
| Plastic viscosity, cP | 33 | 34 | 37 |
| Yield point, lb/100 ft$^2$ | 27 | 34 | 41 |
| 10 Sec gel, lb/100 ft$^2$ | 6 | 10 | 14 |
| 10 Min gel, lb/100 ft$^2$ | 6 | 10 | 15 |
| 30 Min gel, lb/100 ft$^2$ | 6 | 11 | 15 |
| pH | 7.4 | 8.30 | 8.10 |

After addition of the rheological modifier to divalent brine based fluids, significant changes in plastic viscosity, yield point, Low shear rate viscosity, fluid loss, and lubricity of the fluids were observed.

The results indicate that carboxylic acid esters or a phosphate ester blended with ethoxylated glycol are effective to enhance the rheological and multifunctional properties of divalent based fluids including those contaminated with Rev Dust.

Set forth below are various embodiments of the disclosure.

Embodiment 1

A method of improving rheological properties of a divalent brine based downhole treatment fluid at an elevated temperature, the method comprising: adding to the divalent brine based downhole treatment fluid a rheological modifier comprising a carboxylic acid ester, or a phosphate ester blended with an ethoxylated glycol, or a combination comprising at least one of the foregoing in an amount effective to improve the rheological properties of the divalent brine based downhole treatment fluid at a temperature of greater than about 200° F., the divalent brine based downhole treatment fluid comprising calcium bromide, calcium chloride, zinc bromide, zinc chloride, or a combination comprising at least one of the foregoing.

Embodiment 2

The method of any of the proceeding embodiments, wherein the carboxylic acid ester has a formula

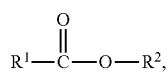

wherein $R^1$ and $R^2$ are each independently a $C_{1-26}$ alkyl, $C_{2-26}$ alkenyl, or $C_{2-26}$ alkynyl group.

Embodiment 3

The method of claim 2, wherein $R^1$ is a $C_{6-20}$ alkyl, $C_{6-20}$ alkenyl, or $C_{6-20}$ alkynyl group; and $R^2$ is methyl. Alternatively, $R^1$ is a $C_{8-14}$ alkyl; and $R^2$ is a $C_{6-20}$ alkyl, $C_{6-20}$ alkenyl, or $C_{6-20}$ alkynyl group.

Embodiment 4

The method of any of the proceeding embodiments, wherein the ethoxylated glycol comprises ethoxylated ethylene glycol, ethoxylated propylene glycol, ethoxylated glycerin, ethoxylated polyethylene glycol, ethoxylated polypropylene glycol, or a combination comprising at least one of the foregoing.

Embodiment 5

The method of any of the proceeding embodiments, wherein the phosphate ester is a hydrocarbyl polyether phosphate ester optionally comprising one or two hydroxyl groups directly attached to phosphorus.

Embodiment 6

The method of any of the proceeding embodiments, wherein the rheological modifier is added to the divalent brine based downhole treatment fluid in an amount of about 1 to about 12 pounds of the modifier per barrel of the divalent brine based downhole treatment fluid.

Embodiment 7

The method of any of the proceeding embodiments, wherein the divalent brine based downhole treatment fluid comprises about 10 to about 18 pounds per gallons of calcium bromide, calcium chloride, or a combination thereof.

Embodiment 8

The method of any of the proceeding embodiments, further comprising adding one or more of the following additional component to the divalent brine based downhole treatment fluid: a fluid loss control agent; a lubricant, a pH modifier; a pH stabilizer; a viscosifier; or a weighting agent. The pH stabilizer comprises a diamine, and the divalent brine based downhole treatment fluid with the diamine has a pH of greater than about 7.5.

Embodiment 9

The method of any of the proceeding embodiments, wherein the rheological properties comprise yield point, low-shear-rate-viscosity, or a combination comprising at least one of the foregoing.

Embodiment 10

The method of any of the proceeding embodiments, wherein the addition of the rheological modifier further improves the fluid loss control and lubricity of the divalent based downhole treatment fluid.

Embodiment 11

A method of conducting a wellbore operation in a subterranean formation, the method comprising: employing in the wellbore operation a divalent brine based drilling or servicing fluid comprising a divalent brine comprising calcium bromide, calcium chloride, zinc bromide, zinc chloride, or a combination comprising at least one of the foregoing; and an rheological modifier comprising a carboxylic acid ester, or a phosphate ester blended with an ethoxylated glycol, or a composition comprising at least one of the foregoing.

Embodiment 12

The method of any of the proceeding embodiments, wherein the carboxylic acid ester has a formula I or II $$R^1-\overset{O}{\underset{\|}{C}}-O-CH_3, \quad \text{(formula I)}$$

$$\text{CH}_3(CH_2)_{n}-\overset{O}{\underset{\|}{C}}-O-R^2 \quad \text{(formula II)}$$

wherein $R^1$ and $R^2$ are each independently a $C_{6-20}$ alkyl, $C_{6-20}$ alkenyl, or $C_{6-20}$ alkynyl group.

Embodiment 13

The method of any of the proceeding embodiments, wherein the divalent brine based downhole treatment fluid comprises about 10 to about 18 pounds per gallons of calcium bromide, calcium chloride, or a combination thereof; and about 1 to about 12 pounds of the modifier per barrel of the divalent brine based downhole treatment fluid.

Embodiment 14

A divalent brine based downhole treatment fluid comprising: about 10 to about 18 pounds per gallons of a divalent brine comprising calcium bromide, calcium chloride, zinc bromide, zinc chloride, or a combination comprising at least one of the foregoing; and about 1 to about 12 pounds of a rheological modifier per barrel of the divalent brine based downhole treatment fluid, the rheological modifier comprising a carboxylic acid ester, or a phosphate ester blended with an ethoxylated glycol, or a composition comprising at least one of the foregoing.

Embodiment 15

The divalent brine based downhole treatment fluid of any of the proceeding embodiments, wherein the carboxylic acid ester has a formula I or II $$R^1-\overset{O}{\underset{\|}{C}}-O-CH_3, \quad \text{(formula I)}$$

$$\text{CH}_3(CH_2)_{n}-\overset{O}{\underset{\|}{C}}-O-R^2 \quad \text{(formula II)}$$

wherein $R^1$ and $R^2$ are each independently a $C_{6-20}$ alkyl, $C_{6-20}$ alkenyl, or $C_{6-20}$ alkynyl group.

Embodiment 16

The divalent brine based downhole treatment fluid of any of the proceeding embodiments, wherein the ethoxylated glycol comprises ethoxylated ethylene glycol, ethoxylated propylene glycol, ethoxylated glycerin, ethoxylated polyethylene glycol, ethoxylated polypropylene glycol, or a combination comprising at least one of the foregoing; and the phosphate ester is a hydrocarbyl polyether phosphate ester optionally comprising one or two hydroxyl groups directly attached to phosphorus.

Embodiment 17

The divalent brine based downhole treatment fluid of any of the proceeding embodiments further comprising a diamine based pH stabilizer, and the fluid has a pH of greater than about 7.5.

Embodiment 18

The divalent brine based downhole treatment fluid of any of the proceeding embodiments, wherein the fluid has a yield point of about 20 lb/100 ft$^2$ to about 40 lb/100 ft$^2$ and a plastic viscosity of 26 cP to 38 cP, each determined by OFITE 900 viscometer at 120° F., after hot rolled fluid at 250° F.

Embodiment 19

The divalent brine based downhole treatment fluid of any of the proceeding embodiments, wherein the fluid has a low shear rate viscosity of greater than 10,000 cP measured by Brookfield viscometer using spindle S62 at 0.5 rpm.

Embodiment 20

The divalent brine based downhole treatment fluid of any of the proceeding embodiments, wherein the fluid has a lubricity coefficient of less than 0.13 measured by an OFITE Lubricity Meter.

All ranges disclosed herein are inclusive of the endpoints, and the endpoints are independently combinable with each other. As used herein, "combination" is inclusive of blends, mixtures, alloys, reaction products, and the like. All references are incorporated herein by reference in their entirety.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

The invention claimed is:

1. A method of improving rheological properties of a divalent brine based downhole treatment fluid at an elevated temperature, the method comprising:
adding to the divalent brine based downhole treatment fluid a rheological modifier comprising a carboxylic acid ester, or a phosphate ester blended with an ethoxylated glycol, or a combination comprising at least one of the foregoing in an amount effective to improve the rheological properties of the divalent brine based downhole treatment fluid at a temperature of greater than about 200° F., and a pH modifier stabilizer comprising a diamine,
wherein the rheological modifier is added to the divalent brine based downhole treatment fluid in an amount of about 0.5 to about 4 pounds of the rheological modifier per barrel of the divalent brine based downhole treatment fluid, the ethoxylated glycol comprising ethoxylated ethylene glycol ethoxylated propylene glycol ethoxylated glycerin, ethoxylated polyethylene glycol ethoxylated polypropylene glycol or a combination comprising at least one of the foregoing, the phosphate ester being a hydrocarbyl polyether phosphate ester optionally comprising one or two hydroxyl groups directly attached to phosphorus, the divalent brine based downhole treatment fluid comprising about 10 to about 18 pounds per gallons of calcium bromide, calcium chloride, or a combination thereof, and the divalent brine based downhole treatment fluid has a pH of greater than about 7.5.

2. The method of claim 1, further comprising adding one or more of the following additional component to the divalent brine based downhole treatment fluid: a fluid loss control agent; a lubricant; a pH modifier; a viscosifier; or a weighting agent.

3. The method of claim 1, wherein the rheological properties comprise yield point, low-shear-rate-viscosity, or a combination comprising at least one of the foregoing.

4. The method of claim 1, wherein the addition of the rheological modifier further improves the fluid loss control and lubricity of the divalent based downhole treatment fluid.

5. The method of claim 1, wherein the pH stabilizer comprises ethylene diamine and about 1 to about 5 wt. % of a polyimidazoline, based on the total weight of the pH stabilizer.

6. The method of claim 1, wherein the divalent brine based downhole treatment fluid has a yield point of about 20 lb/100 ft$^2$ to about 40 lb/100 ft$^2$ and a plastic viscosity of 26 cP to 38 cP, each determined by OFITE 900 viscometer at 120 ° F., after hot rolled the fluid at 250 ° F.

7. The method of claim 1, wherein the divalent brine based downhole treatment fluid has a low shear rate viscosity of greater than 10,000 cP measured by Brookfield viscometer using spindle S62 at 0.5 rpm.

8. The method of claim 1, wherein the divalent brine based downhole treatment fluid has a lubricity coefficient of less than 0.13 measured by an OFITE Lubricity Meter.

* * * * *